Figure 1:
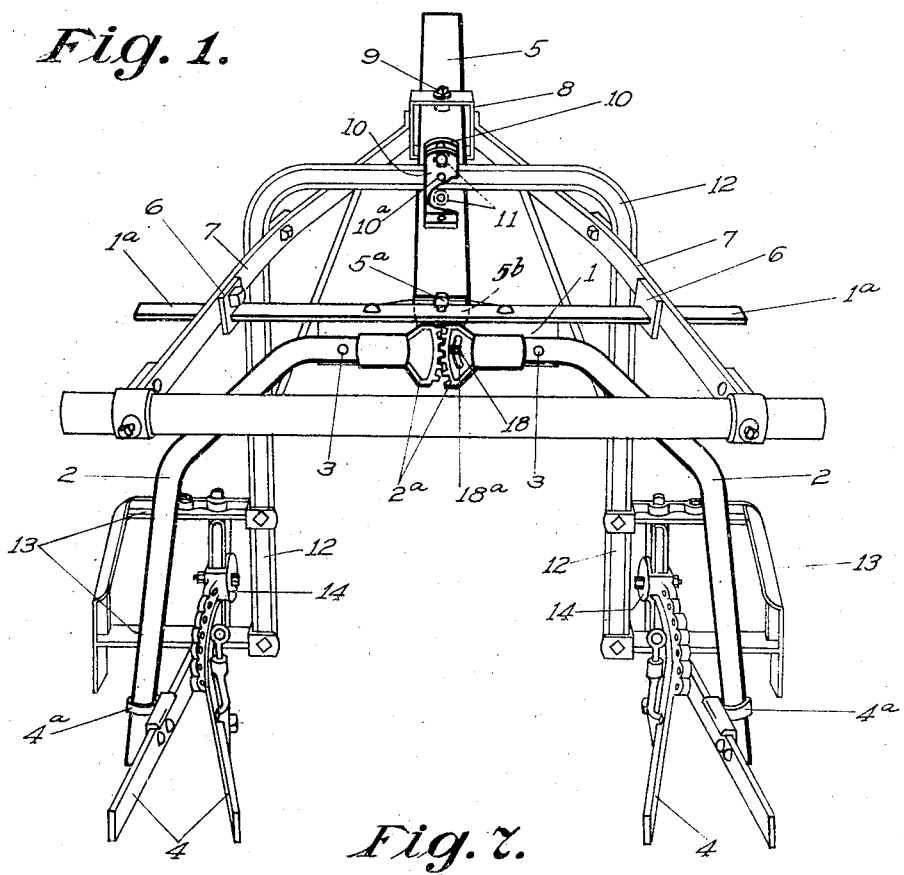

F. C. WARNE.
CULTIVATOR CONTROLLING DEVICE.
APPLICATION FILED JULY 3, 1915.

1,259,941.

Patented Mar. 19, 1918.
2 SHEETS—SHEET 1.

Witness
A. D. Schrader

Inventor
FREDERICK C. WARNE
By Obed C. Billman
His Attorney

F. C. WARNE.
CULTIVATOR CONTROLLING DEVICE.
APPLICATION FILED JULY 3, 1915.
1,259,941.
Patented Mar. 19, 1918.
2 SHEETS—SHEET 2.
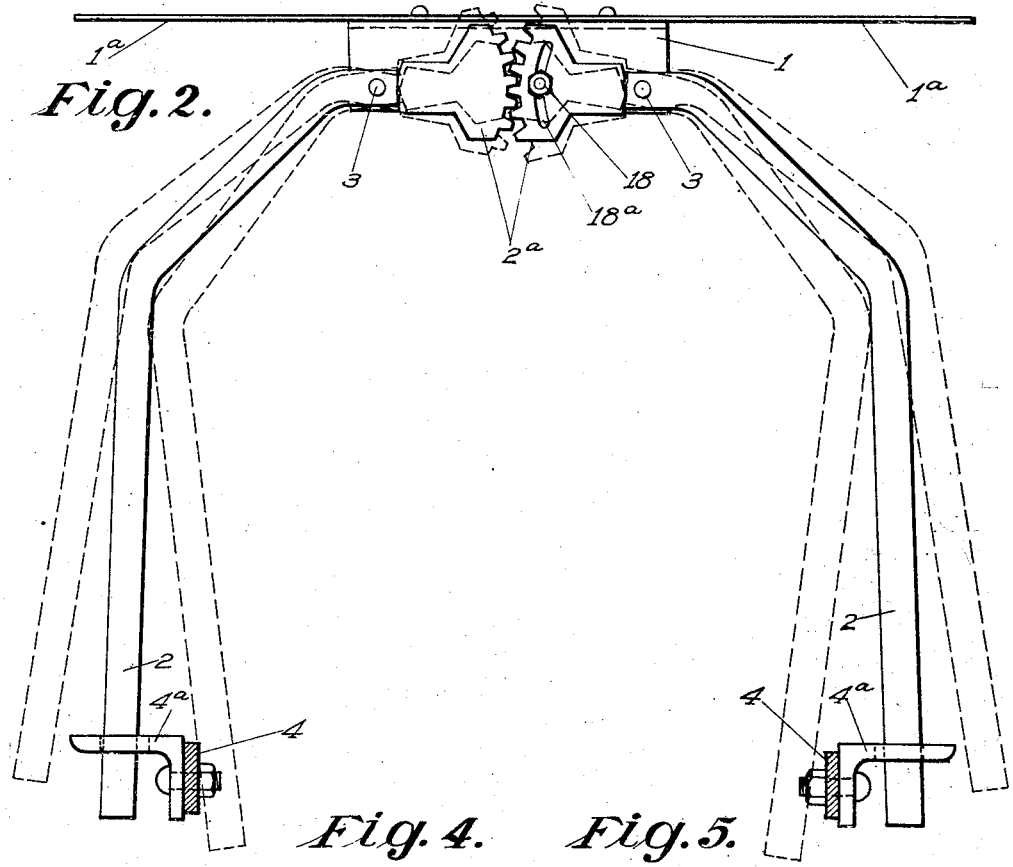
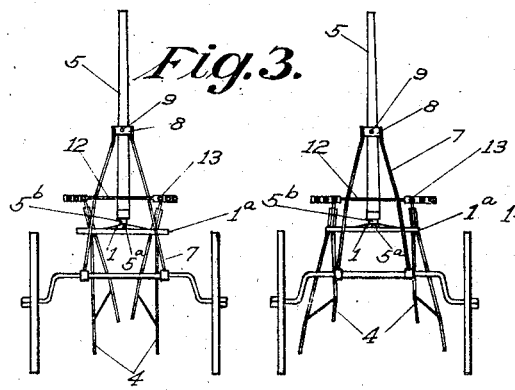
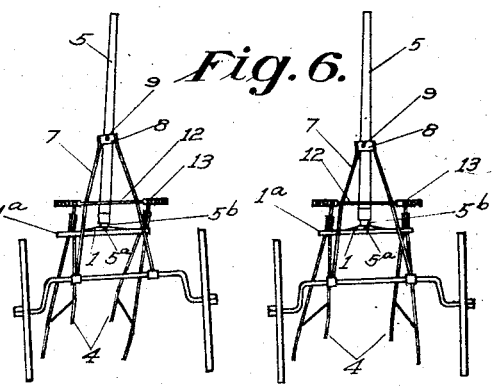
Inventor
FREDERICK C. WARNE

UNITED STATES PATENT OFFICE.

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

CULTIVATOR-CONTROLLING DEVICE.

1,259,941.     Specification of Letters Patent.     Patented Mar. 19, 1918.

Application filed July 3, 1915. Serial No. 37,798.

*To all whom it may concern:*

Be it known that I, FREDERICK C. WARNE, a citizen of the United States, residing at Mansfield, in the county of Richland and State of Ohio, have invented certain new and useful Improvements in Cultivator-Controlling Devices, of which the following is a specification.

My invention relates to improvements in cultivator controlling devices, or more particularly, what may be termed a "universal automatic yoke" specially designed and adapted for use in connection with the pivot gangs of cultivators of either the "pivot wheel" or the "pivot pole" type.

The improved connecting and controlling yoke or device comprises a laterally movable supporting member adapted to be connected either to the pivot wheels or the pivot pole (in accordance with the particular type of cultivator employed) and a gang actuated yoke or device carried by said supporting member and suitably connected to the pivot gangs.

The primary object of the invention is to provide means for use in connection with cultivators whereby the supporting or ground wheels and cultivator gangs may be simultaneously and correspondingly tilted or swung laterally through the single or simultaneous lateral swinging movement or actuation of said gangs to one side or in the same general direction, or the gangs be moved uniformly toward or from each other without imparting any lateral movement to said ground or supporting wheels. In other words, suitable means or mechanism is interposed between and connected to the pivot gangs and the cultivator or supporting wheels (either directly as in the case of a cultivator of the "pivot wheel" type, or indirectly through the medium of a "pivot pole" in the case of a cultivator of the "pivot pole" type) whereby when the gangs are simultaneously swung laterally by the operator in the same direction or to one side through the foot stirrups or the handles, such movement will correspondingly move or actuate the supporting wheels whereby to carry the cultivator frame in the same general direction, or when one of said gangs is moved laterally and independently without the concurrence of the other, said supporting wheels will be correspondingly moved proportionately, or to what may be termed a "half-cut" that is to say, a movement of substantially half of the movement occasioned when both of said gangs are moved in the same direction, as indicated above.

The improved gang actuated automatic universal or equalizing yoke or device is also adapted to stand neutral or out of action with respect to its lateral swinging movements and the corresponding movements imparted to the connected parts when the gangs are moved uniformly and simultaneously toward or from each other, or in other words, when the geared members of the improved yoke or device are correspondingly moved toward and from each other no lateral swinging movement is imparted to the laterally movable supporting member carrying the same.

If a rigid or gang spreader yoke is desired one or both of the yoke arms may be secured in rigid position thereby permitting the pivot gangs and cultivator or ground wheels to be simultaneously swung to one side or the other as above explained, or if the pivoting feature of the pole is not desired, the pivot pole may be secured in a rigid position (in the case of a cultivator of this type), and if the yoke or lever arms are left free the cultivator gangs may be freely worked in the ordinary manner.

With the above mentioned and other ends in view, the invention consists in the novel construction, arrangement, and combination of parts, hereinafter described, illustrated in some of its embodiments and applications in the accompanying drawings, and particularly pointed out in the appended claims.

Referring to the drawings forming a part of this specification, Figure 1, is an isometric rear view of a cultivator of the pivot pole type embodying my invention, the working parts of the improved yoke or device being shown in relatively heavy lines.

Figure 2:
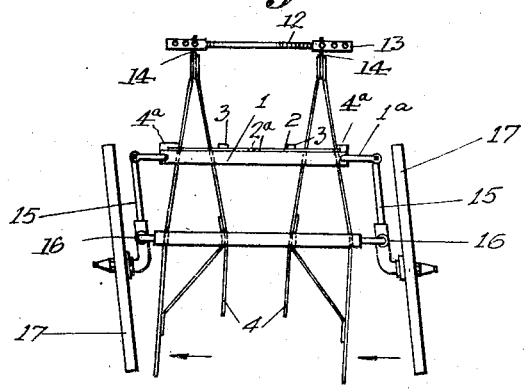

Fig. 2, an enlarged rear elevation of the improved connecting and controlling yoke or device detached from the pivot pole, the dotted lines illustrating the manner in which the geared or compensating yoke members may be simultaneously moved toward or from each other through the like actuation or movement of the pivot gangs without imparting any lateral movements to the laterally movable supporting member or its connections.

Fig. 3, a diagrammatic view illustrating the neutral position of the laterally movable supporting member with respect to the pivot pole and ground wheels when the gangs are simultaneously and uniformly moved toward each other to their extreme inner position.

Fig. 4, a similar view when both gangs are correspondingly swung apart at the same time to avoid an obstruction, or the like, the pole and wheels remaining in the line of draft as in Fig. 3.

Fig. 5, a similar view when the gangs are both swung in the same direction or to their extreme left the pole being correspondingly pivoted and the frame and wheels correspondingly and properly moved, keeping the cultivator in the row at all times with perfect ease and as required.

Fig. 6, a similar view showing the position of the parts, or the "half-cut" position of the wheels and pivot pole when the left gang only is moved to its extreme left without the movement or concurrence of the right gang.

Fig. 7, a diagrammatic view of the device as applied to a cultivator of the pivot wheel type, and showing the position of the parts when the gangs are swung as indicated in Fig. 5 of the drawings.

Similar numerals of reference designate like parts throughout all the figures of the drawings.

The improved connecting and controlling yoke or device comprises, in its present embodiment, a laterally movable supporting member 1, carrying a pair of pivotally mounted yoke or lever members 2, said members 2, being connected or geared to each other intermediate their pivots 3, in some suitable and convenient manner, as for example, by means of segmental gears 2ª, the lower ends of said lever members 2, extending beneath and being flexibly and removably connected to the cultivator beams 4, in the present instance, by means of keeper clips or brackets 4ª, this form of connection between the gangs and the yoke or lever members permitting the operator to give the pivot gangs the requisite vertical and lateral movements without any interference with the proper and required movements of the connected parts.

As applied to a cultivator of the pivot pole type, the laterally movable supporting member 1, is connected to the pivot pole 5, through the medium of a suitable pivot bolt member 5ª, suitably connected to the pivot pole 5, in the present instance, by means of a bracket or plate 5ᵇ, and the laterally movable supporting member 1, is supported in its horizontal or laterally swinging movements by means of a supplementary cross or guide member 1ª, the ends of the latter extending through and being slidably mounted in guide or keeper clips 6, carried, in the present instance, upon the side members 7, of the cultivator frame. It will be seen that the pivot bolt member 5ª, and bracket or plate 5ᵇ, of the pivot pole 5, form a flexible or pivot connection between the rear end of the pivot pole 5, and the laterally movable supporting member 1, carrying the gang actuated yoke or lever members hereinbefore described.

The pivot pole 5, in the present instance, extends forwardly through a pole bearing bracket 8, and is secured therein by means of a vertically extending pivot bolt 9, whereby the rear end of the pole is adapted to swing laterally upon its pivot 9, and relatively to the side members 7, of the cultivator frame for the purpose of swinging the cultivator frames and the wheels carried thereby to the right or to the left by the movements of the cultivator gangs as herein explained. As a means of further supporting the rear end of the pivot pole in the relative swinging or horizontal movements of the latter, suitable brackets 10, carrying guide rollers 11, are provided, said guide rollers 11, being adapted to travel upon the horizontally extending portion of the gang arch 12, as shown.

The cultivator gangs or beams 4, may be pivotally secured to the side members of the gang arch 12, in any suitable and convenient manner, as for example,—by means of coupling frames 13, the latter carrying coupling members 14, said coupling members 14, being pivotally secured to the frames 13, and being adapted to provide both vertical and lateral movement for the pivot gangs.

As applied to a cultivator of the pivot wheel type the laterally movable supporting member 1, may be pivotally attached to forwardly extending arms 15, (see Fig. 7 of the drawings) attached to the pivot sleeves or axles 16, carrying the cultivator or ground wheels 17, so that the pivot wheels will be simultaneously moved to one side or the other as hereinbefore referred to.

If desired, the movable yoke or lever members 2, may be converted into a stationary or spreader yoke by securing one of the lever members 2, in a stationary position, as for example,—by means of a clamping bolt 18, passing through a slot 18ª, in one of the segmental gears 2ª, and through the member 1, as indicated in Fig. 2 of the drawings, and if desired, the pivoting feature of the pivot pole may be dispensed with and the pole be held in a stationary position by passing the bolt or securing element through the opening 10ª, of the bracket 10, shown in Fig. 1 of the drawings.

From the foregoing description, taken in connection with the accompanying drawings, the operation and advantages of my invention will be readily understood.

Having thus described some of the em- bodiments of my invention, and some of the applications or modes of carrying it into effect, without having attempted to set forth all the forms in which it may be made, or all the modes or applications of its use, what I claim and desire to secure by Letters Patent, is,—

1. An adjustable gang spreader yoke, comprising a supporting member, depending levers pivotally carried thereby and provided with arcuate meshing gears on their ends between the pivoted portions of said levers, and clamping means for locking said gears and levers in various adjusted positions.

2. In a cultivator, a supporting member, curved spreader bars pivotally mounted on said supporting member and depending therefrom, segmental gears on said spreader bars at the side of said supporting member, and means on said supporting member for adjusting and securing said gears in various positions.

3. A gang spreading and adjusting device for cultivators, comprising a stationary supporting member, lever members closely and uniformly pivoted thereon and having relatively widely diverging curved arms depending therefrom, arcuate intermeshing gears on said lever members, and means carried by said supporting member for securing said lever members in various adjusted positions.

4. In a gang spreading device for cultivators, a supporting member, lever members pivotally carried thereby and depending therefrom, arcuate gears on said lever members and intermeshing with each other, one of said arcuate gears being provided with a slot, and an adjustable device carried by said supporting member and extending through said slot whereby said gears and lever members may be simultaneously moved and adjusted in various positions.

5. In a cultivator, a pole member, a supporting member carried thereby, and a gang spreader yoke comprising lever members pivotally mounted on said supporting member, arcuate meshing gears carried thereby, one of said gears being provided with a slot, and a clamping bolt extending through said supporting member and said slot whereby said lever members may be simultaneously moved and secured in various adjusted positions.

6. In a cultivator, a cultivator frame comprising forwardly converging side members terminating at their front in a vertical extending bearing frame, a gang arch provided with a horizontal portion extending across said side members of said frame, a laterally swinging pivot pole mounted in said bearing frame and provided with guide members in engagement with said horizontal portion of said gang arch, means for securing said pivot pole in a central stationary position relative to said gang arch, and uniformly adjustable spreader levers and adjusting mechanism carried by the rear end of said pivot pole.

7. In a cultivator, a cultivator frame including side members and a pole receiving bearing frame, a gang arch provided with a horizontally extending intermediate portion extending across said side members, a pole mounted in said bearing frame and centrally connected to said horizontally extending intermediate portion of said gang arch, a support detachably connected to the rear end of said pivot pole, gang spreader levers pivotally connected to and uniformly adjustable on said support, and means on said support for simultaneously and uniformly securing said gang spreader levers in various adjusted positions.

In testimony whereof I have affixed my signature, in presence of two witnesses.

FREDERICK C. WARNE.

Witnesses:
C. A. HINES,
N. P. HENRY, JR.

Copies of this patent may be obtained for five cents each, by addressing the "Commissioner of Patents, Washington, D. C."